United States Patent [19]

Yau et al.

[11] Patent Number: 5,306,755
[45] Date of Patent: Apr. 26, 1994

[54] CORRECTION FLUID CONTAINING A BUTYL METHACRYLATE COPOLYMER DITRIDECYL PHTHALATE, A NON-HALOGENATED SOLVENT AND AN OPACIFYING AGENT

[75] Inventors: Chiou C. Yau, Wrentham; Norman G. Sanborn, Weymouth; Kim H. Ng, Franklin; Thomas G. Decker, Arlington; Deborah A. Mayer, Brockton; Vliet M. Hulse, Duxbury; John Thompson, Medfield, all of Mass.

[73] Assignee: The Gillette Company, Boston, Mass.

[21] Appl. No.: 972,676

[22] Filed: Nov. 6, 1992

Related U.S. Application Data

[63] Continuation-in-part of Ser. No. 866,159, Apr. 9, 1992, abandoned.

[51] Int. Cl.⁵ .............. C08J 5/10; C08K 5/09; C08K 5/12; C08L 33/10
[52] U.S. Cl. ................................. 524/296; 524/430
[58] Field of Search ................... 524/296, 430

[56] References Cited

U.S. PATENT DOCUMENTS

| | | | |
|---|---|---|---|
| 3,674,729 | 7/1972 | Mirick | 260/23 AR |
| 3,997,498 | 12/1976 | Reese et al. | 260/33.80 A |
| 4,165,988 | 8/1979 | Page et al. | 106/23 |
| 4,654,081 | 3/1987 | Dalzell | 106/23 |

FOREIGN PATENT DOCUMENTS

| | | |
|---|---|---|
| 58-2363 | 1/1983 | Japan . |
| 180568 | 10/1983 | Japan . |
| 60-13982 | 1/1985 | Japan . |
| 891730 | 12/1981 | U.S.S.R. . |

OTHER PUBLICATIONS

JayFlex Plasticizers, Product Information, Exxon Chemical (Oct. 1990).
Hypermer Product Information, ICI Specialty Chemical (Jun. 1990).
Neocryl Product Information, ICI Resins US (1990).
Plexigum Product Information, Rohm GmbH.
Dibasic Ester Product Information, DuPont Chemicals.

*Primary Examiner*—Paul R. Michl
*Assistant Examiner*—U. K. Rajguru

[57] ABSTRACT

An ozone-friendly correction fluid includes a non-halogenated solvent, a butyl methacrylate copolymer as the polymeric film-forming material, a plasticizer, and an opacifying agent.

33 Claims, No Drawings

CORRECTION FLUID CONTAINING A BUTYL METHACRYLATE COPOLYMER DITRIDECYL PHTHALATE, A NON-HALOGENATED SOLVENT AND AN OPACIFYING AGENT

This application is a continuation in part of copending U.S. application Ser. No. 07/866,159 filing data Apr. 9, 1992 now abandoned.

The invention relates to correction fluids.

Correction fluids for correcting handwritten, typewritten or photocopy markings on paper are well known and their performance characteristics are well defined. Essential performance characteristics include the ability to provide a film or coalesced residue on drying which can both effectively cover erroneous markings on a paper surface and receive a corrected marking. Preferably, the film covering the marking should be strongly bonded to the paper surface and should also be sufficiently flexible so that the film will not be removed under normal conditions of handling. Additionally, the correction fluid should not interact with the marking to cause excessive discoloration of the resulting film (bleeding). Another important performance characteristic involves the drying rate of the composition which should be as rapid as possible so that corrections can be made relatively quickly. Normally, commercial correction fluids form films which are sufficiently dry to receive a corrected marking in about 30–40 seconds.

Correction fluids typically are a dispersion, i.e., a suspension of solid particles in a liquid. When a correction fluid sits around for some length of time the solid particles begin to settle, causing the fluid near the bottom of the container to become more compact. Compact settling is undesirable because it is no longer easily redispersed thereby reducing coverage or the ability of the fluid to cover markings.

Correction fluids typically include some standard ingredients, including an opacifying agent, a film-forming polymeric material, a volatile solvent, and a dispersing agent. The opacifying agent is the solid that is dispersed in the fluid and provides the basis white color which can be toned with other pigments to provide a correction fluid closely corresponding to the color of the paper to which the fluid is to be applied. The film-forming polymeric material is substantially soluble in the selected solvent and binds pigment to paper and helps to form the flexible but solid covering that remains once the solvent evaporates. The volatile solvent is a carrier for all ingredients mentioned herein. The dispersing agent is included to stabilize the dispersion, i.e., to help ensure that the opacifying agent remains uniformly dispersed in the solvent.

Historically, halogenated hydrocarbons have been the solvents of choice for correction fluid compositions. Halogentated hydrocarbon solvents present special advantages primarily because they have evaporation rates which provide correction fluids that dry rapidly and completely. Additionally, they do not interact with typewritten markings to cause unacceptable bleeding. Also, they can effectively dissolve those film-forming polymeric materials which provide durable but flexible films without causing excessive cockling or distortion of paper surfaces. Despite their recognized advantages when used as correction fluid solvents, the use of halogenated hydrocarbon solvents has become a matter of increased concern primarily because of their adverse effect on the environment (stratospheric ozone depletion). Accordingly, providing an "ozone-friendly" correction fluid be eliminating the use of halogenated hydrocarbon solvents from correction fluids has become a primary objective for the art and significant efforts have been directed to the development of correction fluids free of halogenated hydrocarbon solvents. By ozone-friendly correction fluid, we mean a correction fluid which either does not contain a material that migrates to the stratosphere or, if it contains such a material, the material does not cause a reduction in the ozone concentrations.

SUMMARY OF THE INVENTION

The invention features, in one aspect, a correction fluid includes a volatile, non-halogenated solvent; an butyl methacrylate copolymer as a film-forming material; a plasticizer; and an opacifying agent such as titanium dioxide. Preferably, the composition also contains a dispersing agent. By volatile, it is meant that the solvent has a boiling point of less that 155° C.

The invention features, in another aspect, a correction fluid that includes a volatile, non-halogenated cyclohexane or alkylated cyclohexane containing 10 or fewer carbon atoms as a solvent; a film-forming polymeric material; an alkyl sodium sulfosuccinate as a dispersing agent; a plasticizer for the film-forming polymeric material and an opacifying agent.

The invention features, in yet another aspect, a correction fluid that includes a volatile, non-halogentated cyclohexane or alkylated cyclohexane containing 10 or fewer carbon atoms as a solvent; a film-forming polymeric material; a polymeric fatty ester as a dispersing agent; a plasticizer for the polymeric material; and an opacifying agent.

The invention features, in still another aspect, a correction fluid that includes a volatile, non-halogenated mixture of paraffins and naphthenes as a solvent; a film forming polymeric material, preferable an isobutyl methacrylate copolymer or n-butyl methacrylate copolymer; a copolymeric fatty ester as a as a dispering agent; a plasticizer for the polymeric material; and an opacifying agent.

The preferred dispersing agents include polymeric fatty esters or dialkyl sodium sulfosuccinates. Examples of preferred agents include dioctyl sodium sulfosuccinate and bistridecyl sodium sulfosuccinate.

Preferred alkyl cyclohexane solvents include methylcyclohexane, ethylcyclohexane, and dimethylcyclohexane; the most preferred alkyl cyclohexane solvent is methylcyclohexane. When a paraffin/naphthene solvent is used according to the present invention, it is desirable to utilize a mixture which is high in paraffinic hydrocarbons, preferably about 40%, low in aromatic hydrocarbons, preferably from 0 to 10% aromatic, and the balance being naphtene, preferably about 60%. Most preferably the paraffinic hydrocarbon is predominently $C_7$. The most preferred such blend is Tolu-Sol ™ WHT manufactured by Shell Oil Co., Houston, Tex. These solvents can also be a blended with additional solvents, preferably, such blends include at least 50% of the cyclohexane, alkylated cyclohexane and/or naphthene/paraffin solvent by weight. Preferred additional solvents include odorless mineral spirits, isopropyl alcohol or dibasic ester (DBE), manufactured by DuPont Chemicals, Wilmington, Del., which is a blend of 45–75% dimethyl glutarate, 10–25% dimethyl adipate, and 15–30% dimethyl succinate.

The preferred correction fluid includes between 35% and 55% by weight solvent; between 4% and 13% by weight copolymer; between 1% and 4% by weight plasticizer; between 0% and 3.5% by weight dispersing agent; and between 35% and 55% by weight opacifying agent.

The correction fluid provides excellent coverage without bleeding typed originals writing inks, and copies. Importantly, the fluid exhibits excellent pigment redispersibility after long term storage. Also, because a non-halogenated solvent is employed in the fluid, it is ozone-friendly.

Other features and advantages of the invention will be apparent from the description of the preferred embodiment thereof, and from the claims.

DESCRIPTION OF THE PREFERRED EMBODIMENT

The preferred correction fluid includes methylcyclohexane as the solvent; isobutyl methacrylate or n-butyl methacrylate copolymer as the film-forming material; ditridecyl phthalate plasticizer; titanium dioxide as the opacifying agent; lamp black as a pigment to color match paper; mustard oil as a denaturant; and a fragrance. Most preferably the correction fluid also contains dioctyl sodium sulfosuccinate or a polymeric fatty ester as the dispersing agent.

A sufficient amount of solvent should be included to make the fluid thin enough to be easily spread. So much should not be used so that the hiding power of the fluid diminishes. Preferably, the correction fluid should include 35%-55% by weight solvent.

The preferred isobutyl methacrylate copolymer has a specific gravity of about 1.05 gm/cc and is available under the trade name PLEXIGUM(®) P28 AND NeoCyrl B-705, manufactured by Rohm GmbH Chemische Fabrik, and ICI Resins U.S. respectively. The preferred n-butyl methacrylate copolymers are available under the trade name Elvacite 2044, 2045, 2046, manufactured by DuPont Company.

A sufficient amount of the material should be included to provide good flexibility to the covering, but not so much that the viscosity of the fluid becomes too high, which can lead to reduced coverage and difficult brushing. The present correction fluid also contains an effective amount of a plasticizer to improve flexibility of the copolymer. Preferred plasticizers are dialkyl phthalate compounds and a most preferred plasticizer is Jayflex(®) (DTDP) brand ditridecyl phthalate plasticizer distributed by Exxon Chemical. Preferably, the correction fluid includes between 1% and 4% plasticizer. Preferably, the correction fluid includes between 4% and 12% of the copolymer.

The preferred dialkyl sodium sulfosuccinate, dioctyl sodium sulfosuccinate, is sold under the trade name AERISOL OTS by American Cyanamid Co. The preferred polymeric fatty ester is sold under the trade name HYPERMER LPI by ICI Specialty Chemicals. A sufficient amount of the agent should be included to achieve complete dispersion of the titanium dioxide, but not so much should be included that the hiding power is reduced. The preferred fluid includes between 0% and 3.5% polymeric fatty ester by weight. Bistridecyl sodium sulfosuccinate (sold under the trade name AEROSOL TR70 by American Cyanamid Co.) can also be used.

Suitable titanium dioxide pigments include commercially available rutile titanium dioxides and anatase titanium dioxides or blends or mixtures of these which preferably have an average particle size between about 0.2 to about 0.4 microns and an average oil absorption of about 14 lbs. oil/100 lbs. pigment to about 36 lbs./100 lbs. The amount of titanium dioxide included in the composition can vary depending on the degree of coverage desired. However, amounts between about 30 to about 60 percent by weight titanium dioxide based on total weight of composition are generally suitable. Other opacifying pigments may be used either alone but preferably in combination with the titanium dioxide. Such pigments include zinc sulfide and zinc oxide. Preferably the fluid includes between 35% and 55 % of the opacifying agent by weight.

Lamp black is included as a coloring pigment to match the color of fluid to standard white paper. Other pigments such as raw umber or yellow oxide can also be included to match the tone of colored paper.

A small amount (0.10-2%) of mustard oil is included as a denaturant.

A small amount of a fragrance is included in the preferred formula to help mask the odor of the solvent. Preferred is Fragrance 759292/602185, which is available from Haarmann & Reimer.

Examples of preferred correction fluids are the following:

| Ingredient | Wt % |
| --- | --- |
| Methylcyclohexane | 34.016 |
| Odorless Mineral Spirits | 5.853 |
| Thermaplastic IBMA Copolymer, Neocryl B705 Polymer | 7.241 |
| Jayflex DTDP Plasticizer, Ditridecyl Phthalate | 2.678 |
| Polymeric Fatty ester Hypermer LP1, mfg. by ICI Americas, Inc. | 1.984 |
| Titanium Dioxide, Tipure R-931 | 48.012 |
| Lamp Black | 0.084 |
| Mustard Oil | 0.112 |
| Fragrance 759292/0602185 | 0.020 |
| | 100.000 |

EXAMPLE 2

| Ingredient | Wt % |
| --- | --- |
| Methylcyclohexane | 28.98 |
| Dibasic Esters (DBE), mfg. by DuPont Chemicals | 2.59 |
| Isopropyl Alcohol (anhydrous) | 2.59 |
| Odorless Mineral Spirits | 3.81 |
| Ground bulk polymeric based on i-butyl methacrylate Plexigum P28, mfg. by Rohm GmbH | 8.49 |
| Jayflex DTDP plasticizer Ditridecyl Phthalate (DTDP | 2.92 |
| Titanium Dioxide, Tipure R-931 | 50.40 |
| Lamp Black | 0.09 |
| Mustard Oil | 0.11 |
| Fragrance 759292/D602185 | 0.02 |
| | 100.00 |

EXAMPLE 3

| Ingredient | Wt % |
| --- | --- |
| Paraffin/Naphthene Solvent, Tolu-Sol ™ mfg. by Shell Oil Co., Houston, TX | 37.154 |
| Odorless Mineral Spirits | 5.572 |
| Thermaplastic IBMA Copolymer, | 6.895 |

-continued

| Ingredient | Wt % |
| --- | --- |
| Neocryl B705 Polymer | |
| Jayflex DTDP Plasticizer, Ditridecyl Phthalate | 2.550 |
| Polymeric Fatty ester | |
| Hypermer LP1, mfg. by ICI Americas, Inc. | 1.889 |
| Titanium Dioxide, Tipure R-931 | 45.712 |
| Lamp Black | 0.076 |
| Mustard Oil | 0.130 |
| Fragrance 759292/0602185 | 0.022 |
| | 100.000 |

EXAMPLE 4

| Ingredient | Wt % |
| --- | --- |
| Paraffin/Naphthene Solvent, Tolu-Sol ™ mfg. by Shell Oil Co., Houston, TX | 38.473 |
| Odorless Mineral Spirits | 3.858 |
| Thermaplastic BMA Copolymer, Elvacite 2044 Polymer | 7.925 |
| Jayflex DTDP Plasticizer, Ditridecyl Phthalate Polymeric Fatty ester | 2.815 |
| Hypermer LP1, mfg. by ICI Americas, Inc. | 0.834 |
| Titanium Dioxide, Tipure R-931 | 45.881 |
| Lamp Black | 0.078 |
| Mustard Oil | 0.115 |
| Fragrance 759292/0602185 | 0.021 |
| | 100.000 |

Correction fluids containing the above ingredients are prepared by first dissolving the copolymer in the solvent. Next, the polymeric fatty ester dispersant, if used, and titanium dioxide opacifying agent are added and the mixture dispersed for 3 hours in a bead mill, after which colorants, mustard oil, fragrance, and other ingredients are added to obtain final fluid composition.

Other embodiments are within the claims. For example, in addition to the most preferred ingredients the composition may also include various additives known to those skilled in the art. These additives are incorporated to improved specific properties. These include plasticizers to improved dry film adhesion and flexibility, flattening agents to control film gloss, flow additives and thickeners to control brushing, leveling and settling and pigment extenders to reduce cost. Moreover, other dialkyl sodium sulfosuccinates, in particular those with alkyl groups having less than 15 or 20 carbon atoms, can be used in place of dioctyl sodium sulfosuccinate.

We claim:

1. An ozone-friendly correction fluid comprising:
a non-halogenated solvent;
a film-forming polymeric material comprising a butyl methacrylate copolymer;
a plasticizer comprising ditridecyl phthalate; and an opacifying agent.

2. The correction fluid of claim 1 wherein said solvent comprises a cyclohexane or any alkylated cyclohexane containing 10 or fewer carbon atoms and said film-forming polymeric material is selected from the group consisting of isobutyl methacrylate copolymer, n-butyl methacrylate copolymer or mixtures thereof.

3. The correction fluid of claim 2 wherein the opacifying agent is titanium dioxide.

4. The correction fluid of claim 3 wherein said solvent is methylcyclohexane.

5. The correction fluid of claim 3 wherein said solvent is dimethylcyclohexane.

6. The correction fluid of claim 3 wherein said solvent is ethylcyclohexane.

7. The correction fluid of claim 3 comprising between 35% and 55% of said solvent by weight; between 4% and 12% of said copolymer by weight; between 1% and 4% of said plasticizer by weight; and between 35% and 55% of said opacifying agent by weight.

8. The correction fluid of claim 7 wherein said solvent is methylcyclohexane.

9. The correction fluid of claim 8 further comprising an additional solvent component selected from the group consisting of odorless mineral spirits, isopropyl alcohol, dibasic esters or mixtures thereof.

10. The correction fluid of claim 9 further comprising a dispersing agent.

11. The correction fluid of claim 10 wherein said dispersing agent is a dialkyl sodium sulfosuccinate.

12. The correction fluid of claim 11 wherein said dispersing agent is dioctyl sodium sulfosuccinate.

13. The correction fluid of claim 12 wherein said film-forming polymeric material is isobutyl methacrylate copolymer with a specific gravity of about 1.05 gm/cc.

14. The correction fluid of claim 10 wherein said dispersing agent is a polymeric fatty ester.

15. The correction fluid of claim 14 wherein said film-forming polymeric material is isobutyl methacrylate copolymer with a specific gravity of about 1.05.

16. The correction fluid of claim 1 wherein said solvent comprises a mixture of paraffins and naphthenes and said film-forming polymeric material is selected from the group consisting of isobutyl methacrylate, n-butyl methacrylate or mixtures thereof.

17. The correction fluid of claim 16 wherein said solvent is low in aromatic hydrocarbons, high in paraffinic hydrocarbons with the remainder being naphthenic hydrocarbons.

18. The correction fluid of claim 17 wherein said paraffinic hydrocarbon is predominantly $C_7$.

19. The correction fluid of claim 17 wherein the opacifying agent is titanium dioxide.

20. The correction fluid of claim 19 comprising between 35% and 55% of said solvent by weight; between 4% and 12% of said copolymer by weight; between 1% and 4% of said plasticizer by weight; and between 35% and 55% of said opacifying agent by weight.

21. The correction fluid of claim 20 further comprising an additional solvent component selected from the group consisting of odorless mineral spirits, isopropyl alcohol, dibasic esters or mixtures thereof.

22. The correction fluid of claim 21 further comprising a dispersing agent.

23. The correction fluid of claim 22 wherein said dispersing agent is a polymeric fatty ester.

24. The correction fluid of claim 23 wherein said film-forming polymeric material is isobutyl methacrylate copolymer with a specific gravity of about 1.05.

25. The correction fluid of claim 22 wherein said film-forming polymeric material is n-butyl methacrylate copolymer with a specific gravity of about 106.

26. A correction fluid comprised of methylcyclohexane, odorless mineral spirits, isobutyl methacrylate copolymer, ditridecyl phthalate, polymeric fatty ester and titanium dioxide.

27. The correction fluid of claim 26 comprising about 34% methylcyclohexane, about 6% odorless mineral spirits, about 7% isobutyl methacrylate copolymer, about 3% ditridecyl phthalate, about 2% polymeric fatty ester and about 48% titanium dioxide.

28. A correction fluid comprised of methylcyclohexane, dibasic esters, isopropyl alcohol, odorless mineral spirits, isobutyl methacrylate copolymers, ditridecyl phthalate and titanium dioxide.

29. The correction fluid of claim 28 comprising about 29% methylcyclohexane, about 3% dibasic esters, about 3% isopropyl alcohol, about 4% odorless mineral spirits, about 8% isobutyl methacrylate, about 3% ditridecyl phthalate and 50% titanium dioxide.

30. A correction fluid comprised of a paraffin and naphthene solvent mixture, odorless mineral spirits, isobutyl methacrylate copolymer, ditridecyl phthalate, polymeric fatter ester and titanium dioxide.

31. The correction fluid of claim 32 comprising about 37% paraffin and naphthene mixture, about 6% odorless mineral spirits, about 7% isobutyl methacrylate copolymer, about 2% ditridecyl phthalate, about 2% polymeric fatty ester and about 46% titanium dioxide.

32. A correction fluid comprised of a paraffin and naphthene solvent mixture, odorless mineral spirits, n-butyl methacrylate copolymer, ditridecyl phthalate, polymeric fatty ester and titanium dioxide.

33. The correction fluid of claim 32 comprising about 38.5% paraffin and naphthene mixture, about 4% odorless mineral spirits, about 8% n-butyl methacrylate copolymer, about 3% ditridecyl phthalate, about 1% polymeric fatty ester and about 45.5% titanium dioxide.

* * * * *